United States Patent
Miretti

(10) Patent No.: US 8,431,836 B2
(45) Date of Patent: Apr. 30, 2013

(54) CONNECTOR APPARATUS AND SYSTEM FOR EXPLOSION PROOF ENGINE

(75) Inventor: Angelo Miretti, Milan (IT)

(73) Assignee: Miretti SpA, Limbiate (MB) (IT)

( * ) Notice: Subject to any disclaimer, the term of this patent is extended or adjusted under 35 U.S.C. 154(b) by 471 days.

(21) Appl. No.: 12/590,319

(22) Filed: Nov. 5, 2009

(65) Prior Publication Data

US 2010/0108020 A1    May 6, 2010

Related U.S. Application Data

(60) Provisional application No. 61/198,539, filed on Nov. 6, 2008.

(51) Int. Cl.
- *H02G 3/18* (2006.01)
- *H02G 15/02* (2006.01)
- *H01R 13/46* (2006.01)
- *H01R 13/58* (2006.01)
- *H01R 13/40* (2006.01)
- *F16L 5/02* (2006.01)

(52) U.S. Cl.
USPC .............. 174/653; 174/59; 174/77 R; 16/2.2; 439/461; 439/462; 439/589

(58) Field of Classification Search ............... 174/65 R, 174/65 SS, 64, 653, 77 R, 74 R, 74 A, 75 B, 174/80, 84 R, 59, 65 G, 135, 153 G, 153 R, 174/152 G, 151, 31 R, 35 GC, 35 R, 91; 248/56; 16/2.1, 2.2; 439/461, 462, 581, 439/583, 584, 471, 604, 271, 277, 320, 589; 385/134; 285/158, 161; 123/305
See application file for complete search history.

(56) References Cited

U.S. PATENT DOCUMENTS

| | | | | |
|---|---|---|---|---|
| 3,833,754 A | * | 9/1974 | Philibert | 174/653 |
| 4,515,516 A | * | 5/1985 | Perrine et al. | 417/38 |
| 5,194,012 A | * | 3/1993 | Cairns | 439/201 |
| 5,432,301 A | * | 7/1995 | Gehring | 174/78 |
| 6,623,289 B2 | * | 9/2003 | Decicco | 439/271 |
| 6,668,793 B2 | * | 12/2003 | Okamoto et al. | 123/299 |
| 6,812,406 B2 | * | 11/2004 | Hand | 174/667 |
| 7,285,782 B2 | * | 10/2007 | Schubert | 250/339.13 |
| 7,735,876 B2 | * | 6/2010 | Chiu | 285/207 |
| 2004/0121637 A1 | * | 6/2004 | Beege et al. | 439/271 |

* cited by examiner

*Primary Examiner* — Hoa C Nguyen
*Assistant Examiner* — Binh Tran
(74) *Attorney, Agent, or Firm* — Henry I. Schanzer, Esq.

(57) ABSTRACT

Explosion proof enclosures and explosion proof connectors and sensors are used to render a machine, intended to be operated in an explosive environment, explosion proof. An explosion proof connector includes an intermediate section having an input portion to receive a cable from a terminal external to an explosion proof enclosure and an output portion for passing the cable for connection to a terminal within an explosion proof enclosure. A sealing tube which extends between the input and output portions has a central opening for enabling a cable to be passed through. A sealant may be injected into the sealing tube to form an air tight connection between the cable and the inner walls of the sealing tube which inhibits a hazardous condition from passing through and around the sealing tube. An explosion proof sensor includes potting and encasing the sensor in its own explosion proof case.

19 Claims, 14 Drawing Sheets

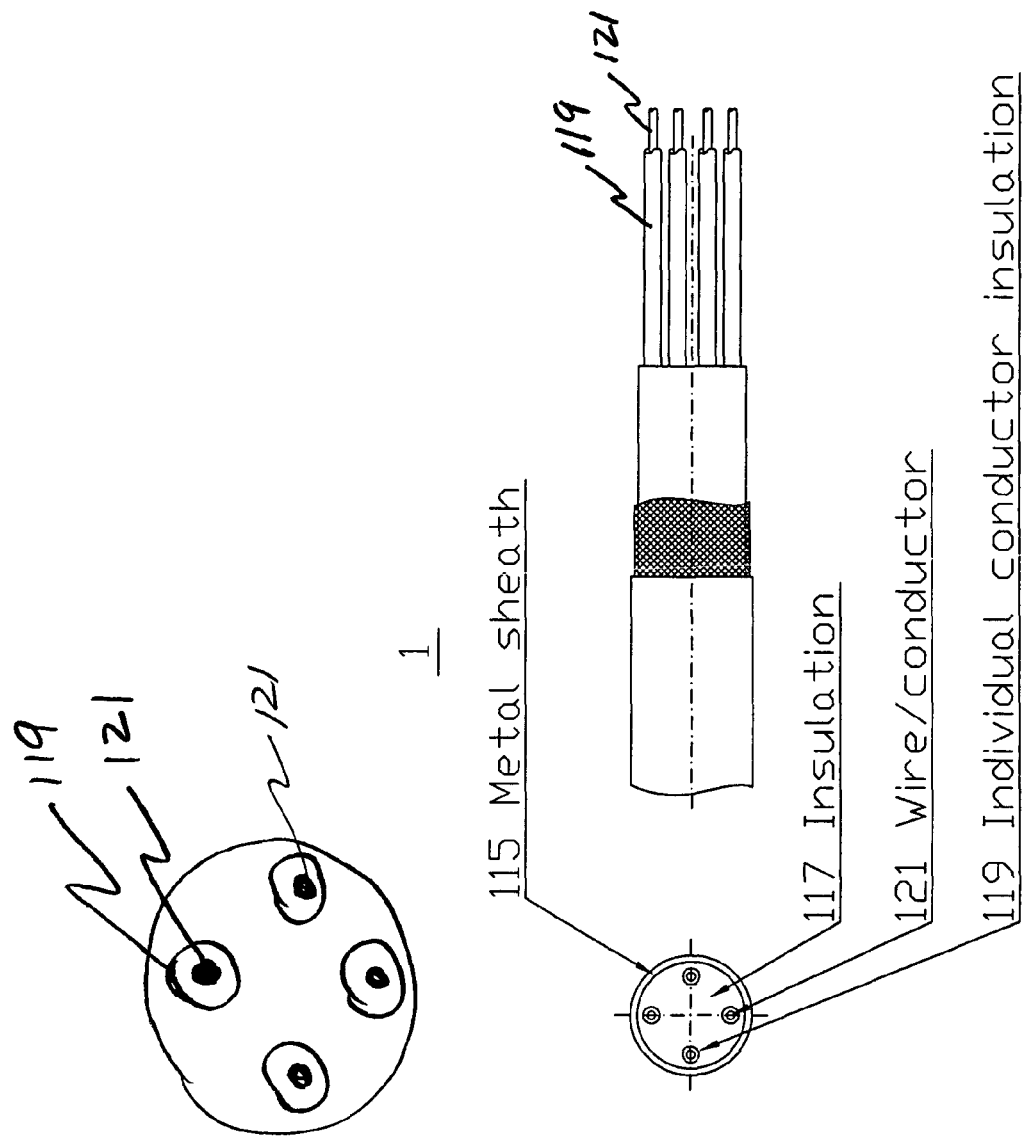

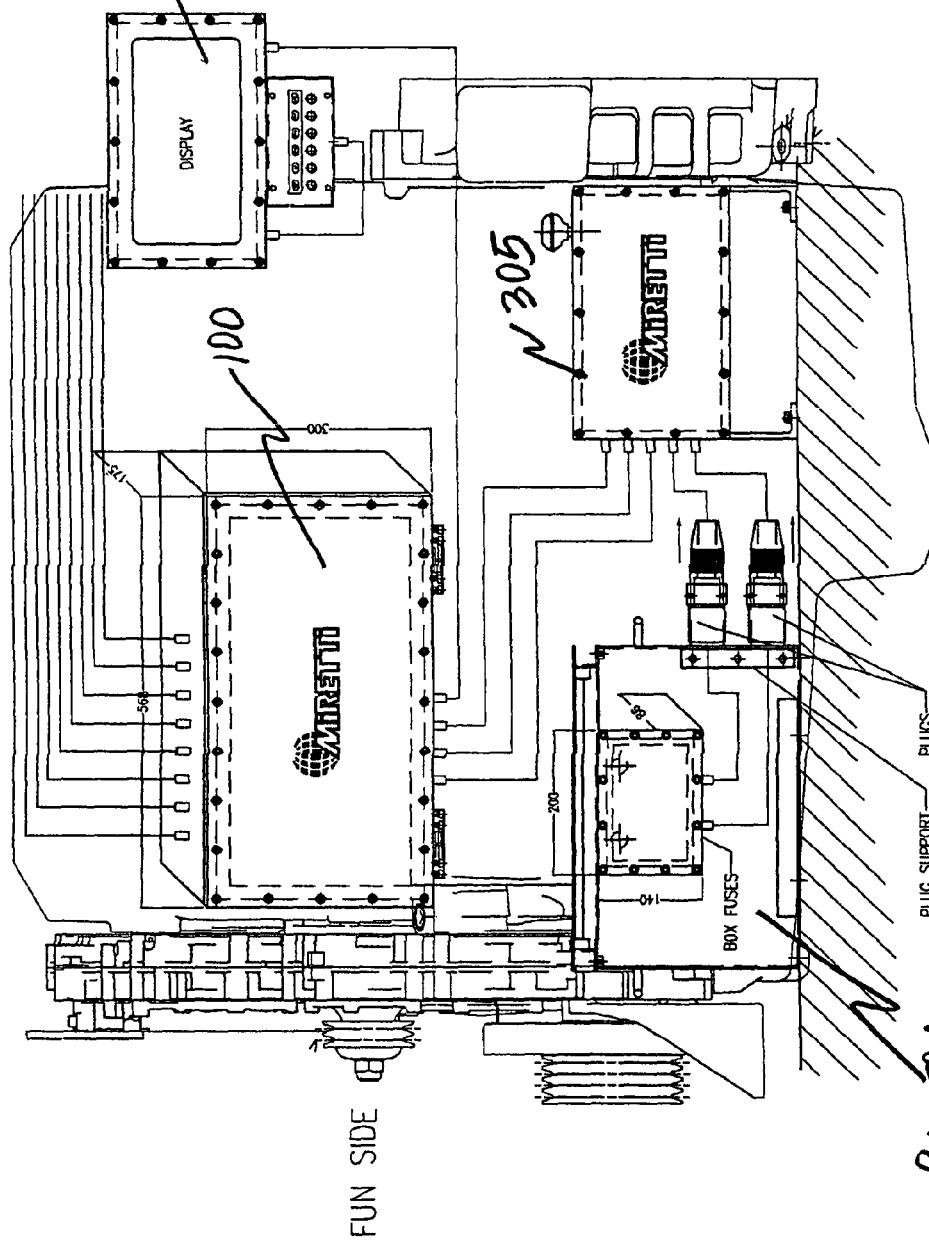

CONNECTOR APPARATUS AND SYSTEM FOR EXPLOSION PROOF ENGINE

This invention claims priority from provisional application Ser. No. 61/198,539 filed Nov. 6, 2008 for Connector Apparatus And System For Explosion Proof Engine whose teachings are incorporated herein by reference.

BACKGROUND OF THE INVENTION

This application relates to explosion proof connectors and systems and to engines and machinery which have to be operated in an environment where explosive gases and flammable substances are present.

Some industrial environments have an explosive atmosphere whereby a spark can ignite an explosion. A potential source of sparks is circuitry and machinery used to perform certain desired operations. For example, an internal combustion engine (ICE) and its associated circuits (e.g., motors) normally generate sparks, flames and/or intensely hot fumes during their operation (i.e., a hazardous condition). Inherently sparking or flame producing components are generally enclosed in an explosion proof compartment to prevent a hazardous condition generated inside the compartment from igniting the explosive atmosphere outside the compartment.

A problem exists in extending connections between points (terminals, components) inside the explosion proof compartment and points (terminals, components) outside the compartment. With respect to electrical connections, in order to extend a connection between a terminal inside the explosion proof compartment and a terminal outside the compartment a feedthrough connector must typically pass through the wall of the explosion proof compartment without compromising the integrity of the compartment. A type of useful connector is a cylindrical feedthrough connector (also referred to as a cable gland) which may be threaded or slip fitted into a mated opening in a wall of the explosion proof compartment.

However, known feed through connectors are difficult to assemble and do not ensure that hazardous condition(s), e.g., sparks, emanating from the explosion proof compartment is/are inhibited from passing through the connector.

Another problem arises out of the use of numerous different sensors and their interconnection within and/or between different explosion proof compartments. The sensors may themselves be the source of sparking due to mechanical or electrical (e.g., being shorted) malfunctions. There is therefore a problem due to the malfunctioning of the sensors which may result in the generation of a hazardous condition in an explosive environment. In addition, there is the problem of coupling a sensor external to an explosion proof enclosure with a terminal inside an explosion proof compartment.

Still another problem relates to the location and placement of explosion proof components and their compartments and the routing of interconnections to reduce the generation of a hazardous condition which could cause an explosion.

It is an object of the invention to resolve the various problems discussed above.

SUMMARY OF THE INVENTION

Accordingly, it is an object of the invention to provide an "explosion proof" feed through connector (also referred to herein as a "cable gland"), for coupling a cable between a terminal inside an explosion proof compartment and a terminal external thereto, which inhibits hazardous conditions (e.g., sparks or flames) from passing through and along or around the cable located within the connector. Note the term cable as used herein and in the appended claims includes, and is equally applicable to, any number of conductors and/or wires. Also, the term connector as used herein, and in the appended claims, includes and refers to a feedthrough connector or a gland.

A feedthrough connector (cable gland) embodying the invention includes a generally cylindrical intermediate section having an internal central opening. The intermediate section has an a lower (input) portion to receive a cable from a terminal (or terminals) external to an explosion proof enclosure and an upper (output) portion for passing the cable for connection to a terminal (or terminals) within an explosion proof enclosure. A sealing tube extends between the input and output portions along the internal central opening of the intermediate section. The sealing tube also has a central opening for enabling a cable to be passed through. When a cable is suitably inserted though the sealing tube, a sealant may be injected into the sealing tube to form an air tight connection between the cable and the inner walls of the sealing tube which inhibits a hazardous condition (e.g., sparks and/or flames) from passing through and around the sealing tube.

In accordance with one aspect of the invention the feedthrough connector includes means for securing the cable and the sealing tube within the lower portion of the intermediate section and a cup-shaped base nut for capping the input end of the input portion, with the base nut having an internal central opening for enabling the cable to pass through and being structured (e.g., having a threaded region) to engage with the outer surface of the lower portion of the intermediate section to form a tight fit. The feedthrough connector also includes means for capping the upper, output, portion of the intermediate section and securing it to an explosion proof enclosure. The capping and securing means may include a tubular member with a base at one end to cap the output portion of the intermediate section. The opposite, top, end of the tubular means extends to mate with a corresponding opening in the wall of the enclosure while providing an explosion proof passageway to pass the cable and inserting it into the explosion proof enclosure. Also included is a cup-shaped top nut having a central opening for enabling the tubular member to pass through and having a structure (e.g., a threaded section) to engage the upper portion of the intermediate section to form a tight fit securing the tubular member to the intermediate section. The top end of the tubular member is mated with a corresponding opening in the wall of the enclosure and extends to and/or within the explosion proof enclosure.

In one embodiment, the sealing tube has a bottom end within the lower portion of the intermediate section and an upper end within the upper portion of the intermediate section; and wherein there is included a cylindrical retaining ring, a cone shaped wedge component and a cylindrical rubber grommet (providing thermal and electrical isolation) located between the bottom end of the sealing tube and the base nut which can be rotated to produce a tight fit among the components in the lower portion and ensure a tight seal inhibiting any hazardous condition from passing through the lower portion.

The retaining ring and the cone shaped wedge cooperate as follows. The insulation layer of a cable may be peeled back and draped around the retaining ring. The wedge shaped conic section can then be pushed down to hold the insulation firmly in place. The grommet and sealing tube and base nut cooperate to hold all the pieces tightly in place.

In accordance with another aspect of the invention, selected sensors may be individually packaged, potted and encased in an explosion proof enclosure whereby the sensors can be eliminated as a source of generating a hazardous condition (e.g., sparking). The sensors may be packaged to have a threaded termination or to be slip fitted (non threaded). The encapsulated sensors may be coupled to terminals within an explosion proof enclosure via the feed through connectors discussed above.

The explosion proof connectors and associated cable assemblies embodying the invention can be more easily assembled and disassembled than presently known connectors. Also, they and explosion proof sensors of the invention can be used to interconnect strategically placed components (e.g., battery, fuel injectors) such that the explosion proof connectors and the explosion proof sensors can be used in, and within, a machine, such as an internal combustion engine (ICE), to aid in rendering such machine explosion proof.

These and other aspects of the invention are discussed in greater detail below.

BRIEF DESCRIPTION OF THE DRAWINGS

In the accompanying drawings, which are not drawn to scale, like reference characters denote like components; and FIGS. 1 and 1A are simplified exploded views of components used to form an "explosion proof" connector and cable assembly embodying the invention and which are suitable for use in interconnecting various parts and components of an ICE;

FIG. 1C is a cross sectional diagram of a cable which may be used in systems embodying the invention;

FIGS. 3A, 3B, 3C, 3D, 3E and 3F are diagrams showing electrical interconnections and of various subsystems of an ICE and their placement and the distribution of selected signals and power components for forming an explosion proof system embodying the invention;

DETAILED DESCRIPTION

Figure 1A:
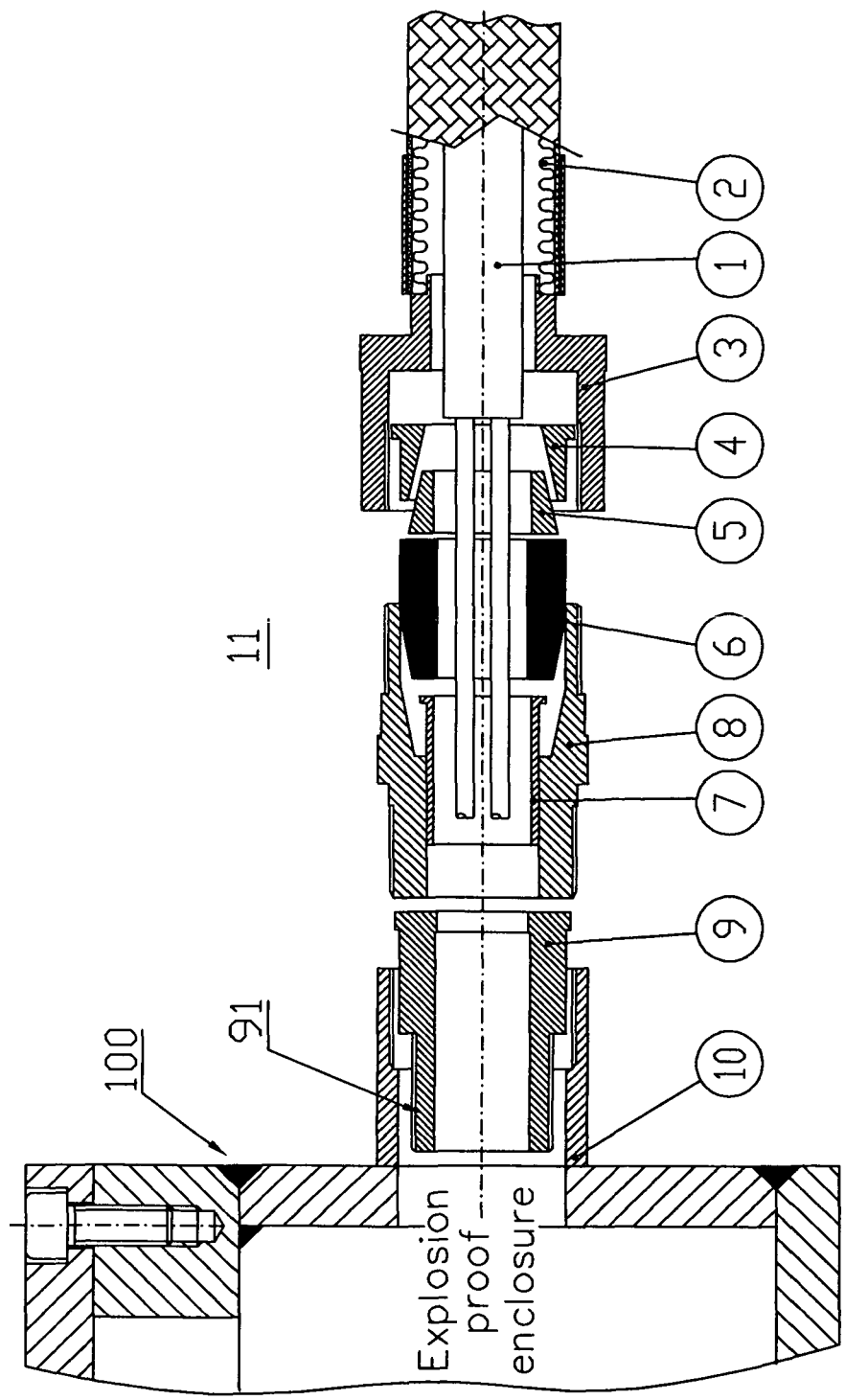

FIGS. 1, 1A, 1B and 2 show components of an explosion proof feedthrough connector (cable gland) 11 embodying an aspect of the invention. Going from right to left in FIGS. 1, 1A, and 2, the connector 11 includes a bottom capping or base nut 3, a circular bushing 4, a conical cable blocking wedge 5, a cylindrical rubber ring (grommet) 6, a cylindrical metal sleeve sealing member 7, an intermediate cable gland assembly 8, an explosion proof ring 9 with a cylindrical (tubular) threaded extension 91, and a cylindrical top nut 10 with internal threads to cap the connector. The feedthrough connector 11 is designed to couple a cable between a terminal (or terminals) external to an explosive proof enclosure 100 and a terminal (or terminals) located within the enclosure 100. For ease of description the end of the connector 11 and intermediate gland 8 adapted to receive a cable from terminals outside of the enclosure 100 will be referred to as the input (or lower) end of the connector 11 or of the intermediate gland 8; and the end of connector 11 and gland 8 adapted to couple the cable to a terminal within the enclosure will be referred to as the output (or upper) end of the connector 11 or of the intermediate gland.

A cable 1, containing a number of conductors, is intended to be inserted through the connector 11 and to terminate within an enclosure 100. The connector 11 provides a means for securing a cable 1 (or its conductors) which is being connected to and/or within an enclosure 100 whose contents may cause explosions, arcing, sparking and other severe hazardous conditions. The enclosure 100 (as well as the other explosion proof enclosures used herein) is designed to be explosion proof in that it isolates the electric/electronic components and equipment from the surrounding atmosphere. Thus, any and all faults which may occur inside the enclosure are intended to be contained within the enclosure so that it does not cause fires and or explosions in the surrounding area. The connector 11 is designed to block hazardous conditions (e.g., sparks, flames) occurring within the enclosure from traveling out of the enclosure through the connector and along the cable.

As shown in FIG. 1C, the cable, 1, may include, for example, one or more electrically conductive conductors 121, typically, insulated from each other via individual insulating sleeves 119. The conductors (4 are shown for example in FIG. 1C) are surrounded by insulation 117 which is enclosed by a sheath 115 which may include metallic fibers. This type of cable is also referred to as being armored. The diameter (cross-sectional area) of the cable may vary greatly in size. The cable 1 may be enclosed within a conduit 2 which may have a metallic protective cladding or any other suitable protective coating.

In the figures, the cable 1 is passed through the jacket/conduit, 2, which may be welded to an external portion of base nut 3 of the connector. The base nut, 3, may be described as being cup-shaped and is generally of cylindrical shape having a shoulder region 311 with a central opening from which depends a cylindrical neck 313 for the cable 1 to pass through. The base nut 3 has an upper cylindrical portion 315 with a threaded inner surface. The circular/cylindrical bushing (ring) 4 has a base which rests on the internal shoulder of base nut 3 and which can rotate relatively freely. The conical wedge 5 fits within the inner portion of cylindrical ring 4 and rests along the inner sides/surfaces of the cylindrical ring 4. The bushing 4 and conical wedge 5 also have centered openings for allowing a cable to pass through.

Bushing 4 and wedge 5 may be used to perform a function best explained with reference to FIG. 1B. Going from left to right in FIG. 1B, an insulated cable 1 having a metallized sheath 115 is passed through the base nut 3 and the cylindrical bushing 4. The base of the cylindrical bushing 4 rests on the internal shoulder, 311, of base nut 3. The outer insulation sheath 115 of cable 1 is peeled back to expose the metallic fibers which are terminated and draped around the external portion of ring 4. The conical wedge 5 is then pushed down (wedged) against the inner surfaces of cylindrical bushing 4 with the metallic fibers 115 wedged between the conic wedge 5 and the bushing 4. The conductors of cable 1 surrounded by the insulator 117 are passed through the center of the rubber grommet 6 which rests on top of the fitted cylindrical bushing 4 and conical ring 5. The insulation material 117 surrounding the conductors may be removed above rubber grommet 6. The conductors 121 of cable 1 with their respective individual insulating sleeves, 119, are passed through the central opening of a cylindrical (tubular) sleeve 7.

When the required length of cable is passed through the sleeve 7 and then the length of the connector to ensure connection at the output end, a sealant may be injected within the sleeve 7 and around the conductors of cable 1. This creates an airtight seal around the conductors of cable 1 (or whatever portion of cable 1 is present within the sleeve 7). Sleeve 7 has a lower lip 715 (see also FIG. 1A) which can sit flush against the top of rubber grommet 6 and which can bump up against the lower surface of the inner shoulder, 815, of intermediate gland 8. The conductors of cable 1 are passed through the central region of sleeve 7 which is positioned within the central region of intermediate gland 8.

The cylindrical rubber sleeve (grommet), 6, is positioned on top of the assembly 4, 5. Rubber grommet 6 has a central opening for enabling a cable to be passed through relatively freely. Note that rubber sleeve 6 is also designed such that after the cable is inserted and in position and when the connector is tightened, the rubber grommet 6 will be squeezed so that its inner diameter decreases and its inner surface will tighten about the cable and its outer diameter will expand. The cylindrical metal sleeve 7 for sealing fitting is mounted above the rubber sleeve 6 and its lip 715 will be pressed and held against shoulder 815, when base nut 3 is fully rotated.

Another significant role played by rubber grommet 6 is that it is an electrical insulator and a thermal insulator. Grommet 6 will inhibit any sudden rise in temperature of the sleeve 7 from being coupled to the metallic fibers of sheath 115 (or vice-versa) by providing a high thermal barrier. Similarly, it is also an electrical insulator and will block any electrical signal from being coupled between the sheath 115 and the sleeve 7.

The intermediate gland assembly 8 is a relatively long cylindrical member which includes an input (lower or bottom) portion 811 and an output (upper or top) portion 813 with a central tubular portion through which the sealing sleeve 7 can be located. In FIG. 1B, a ledge 815 is formed between the lower and upper portions of gland 8. The ledge 815 may be midway between the top and bottom portions, but that is not a necessary condition. Ledge 815 functions as a stop for the lip of sleeve 7. In FIG. 1B the top of the upper portion 813 has a top, shoulder, 817 along and above which rests the lower portion of ring 9. The gland assembly 8 has external (screw) threads formed along the outer surfaces of its bottom and top portions.

The external threads on the bottom half 811 of gland 8 are intended to be engaged (threaded) with the threads on the inner surface of base nut 3. Nut 3 functions to cap the input portion of gland 8. When nut 3 is turned it also functions to tighten the connection with input portion 811 and to secure the components 4, 5, 6 and 7 within the input (lower) portion to form a tight explosion proof chamber. The external threads on the top half portion 813 of gland 8 are intended to be engaged (threaded) with the threads on the inner surface of upper seal tight nut 10 to also form a tight explosion proof connection to secure explosion proof ring 9 and provide an explosion proof joint. Threaded nuts and parts have been used to illustrate the invention. However it should be understood that other means may be used to form secure and tight connections.

In FIGS. 1, 1A, 1B and 2 explosion proof ring 9 has a threaded extension 91 designed to fit (be threaded) into an explosion proof box (e.g., 100). The explosion proof capping ring is secured to the rest of the connector by upper seal tight nut 10. It should be appreciated that the combination of components 9 and 10 enable the connector to be more easily assembled and disassembled to permit easier interconnection and disconnection.

Note that instead of the top seal tight nut 10 and explosion proof ring 9 shown in FIGS. 1 and 1A, a top nut having an extended tubular threaded member may be used together with a sealing ring to provide an explosion proof connection with the enclosure 100.

Figure 1B:
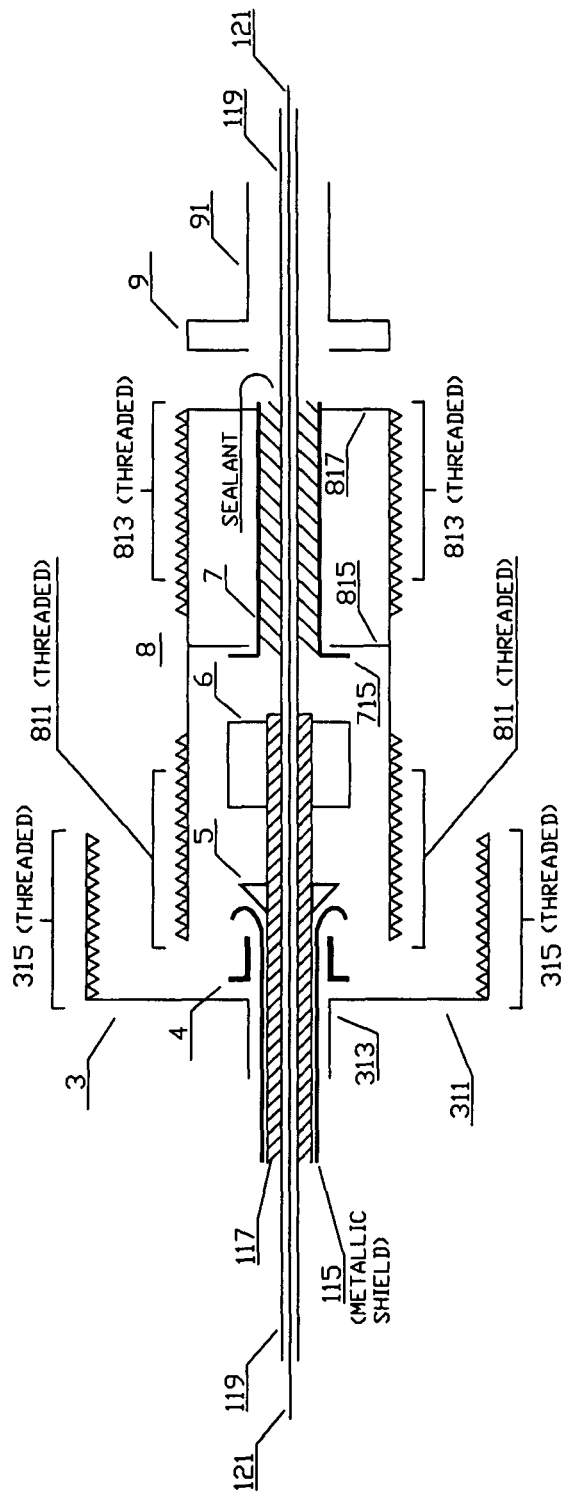
FIG. 1B is a simplified, illustrative, cross-sectional diagram of a connector embodying the invention illustrating the securing of a cable's insulator layer.
Figure 2:
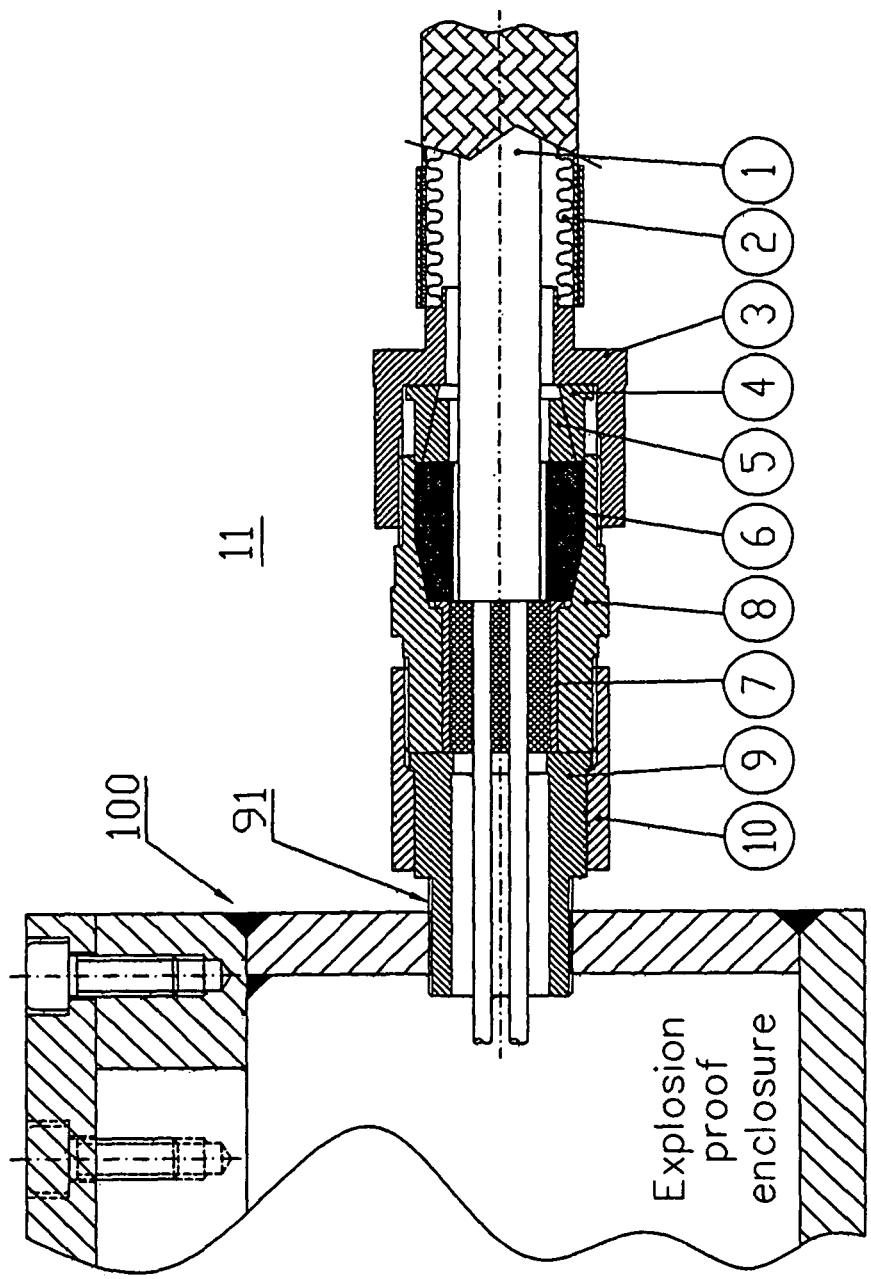
FIG. 2 is a cross sectional diagram of an "assembled" connector.
Figure 3A:
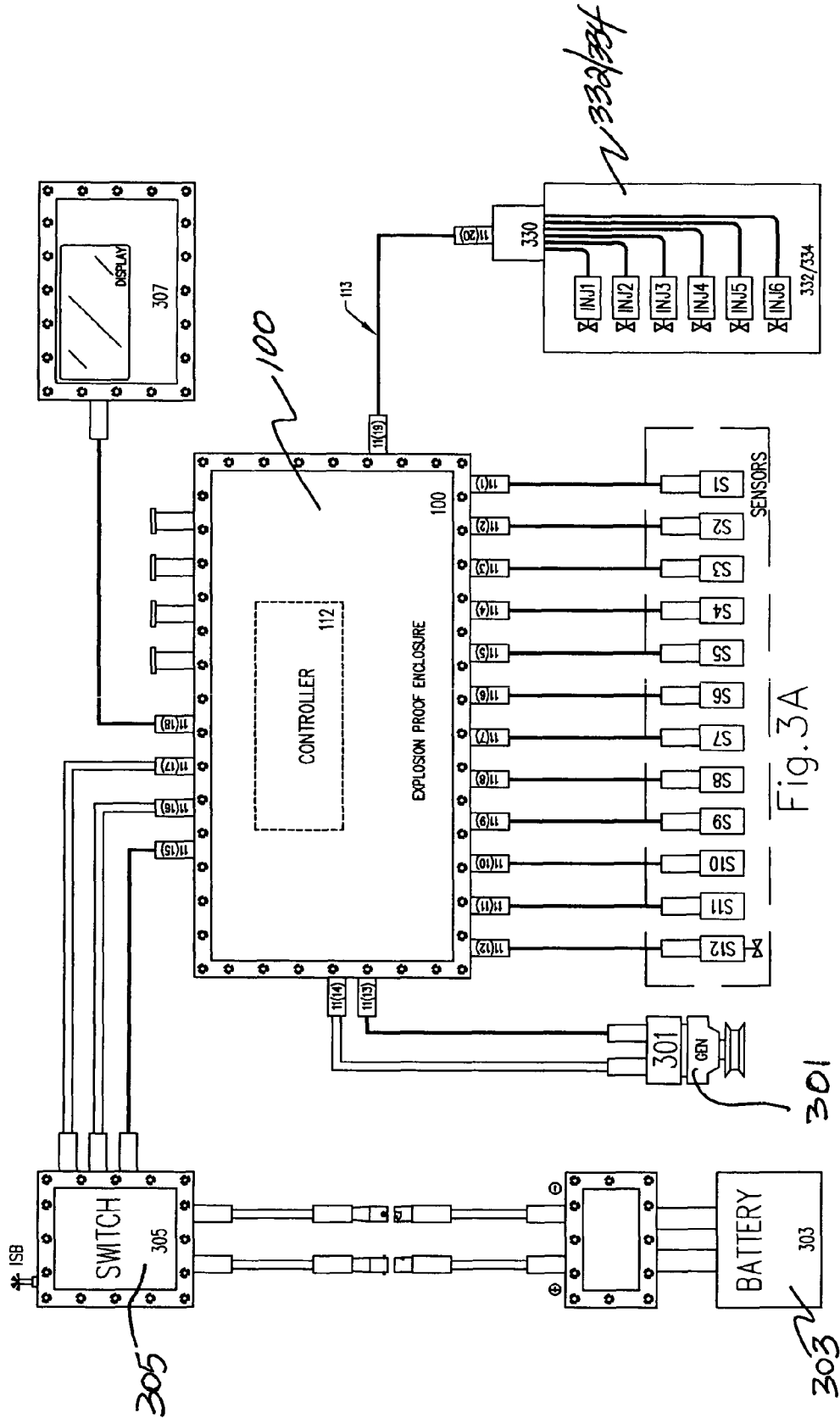
Figure 3B:
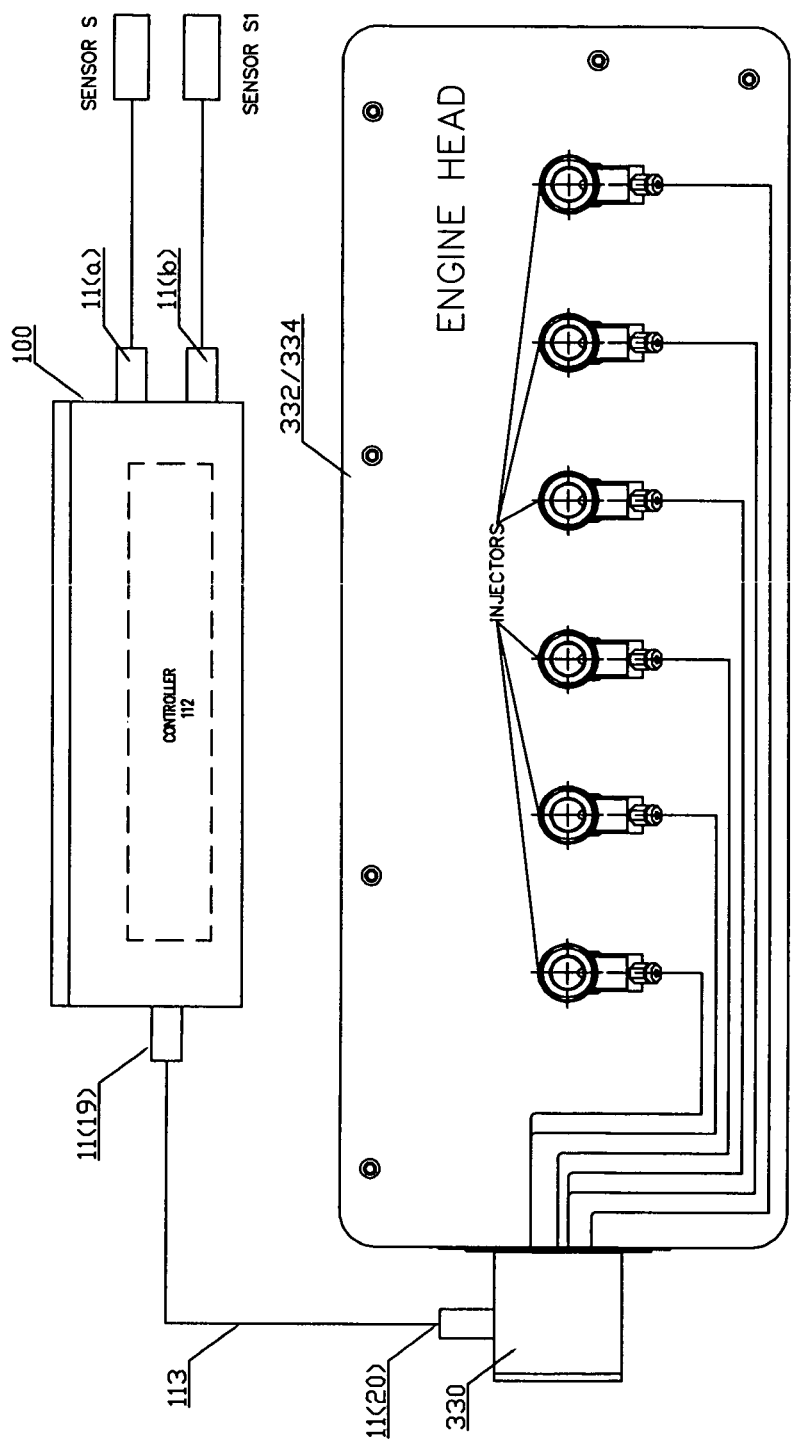
Figure 3C:
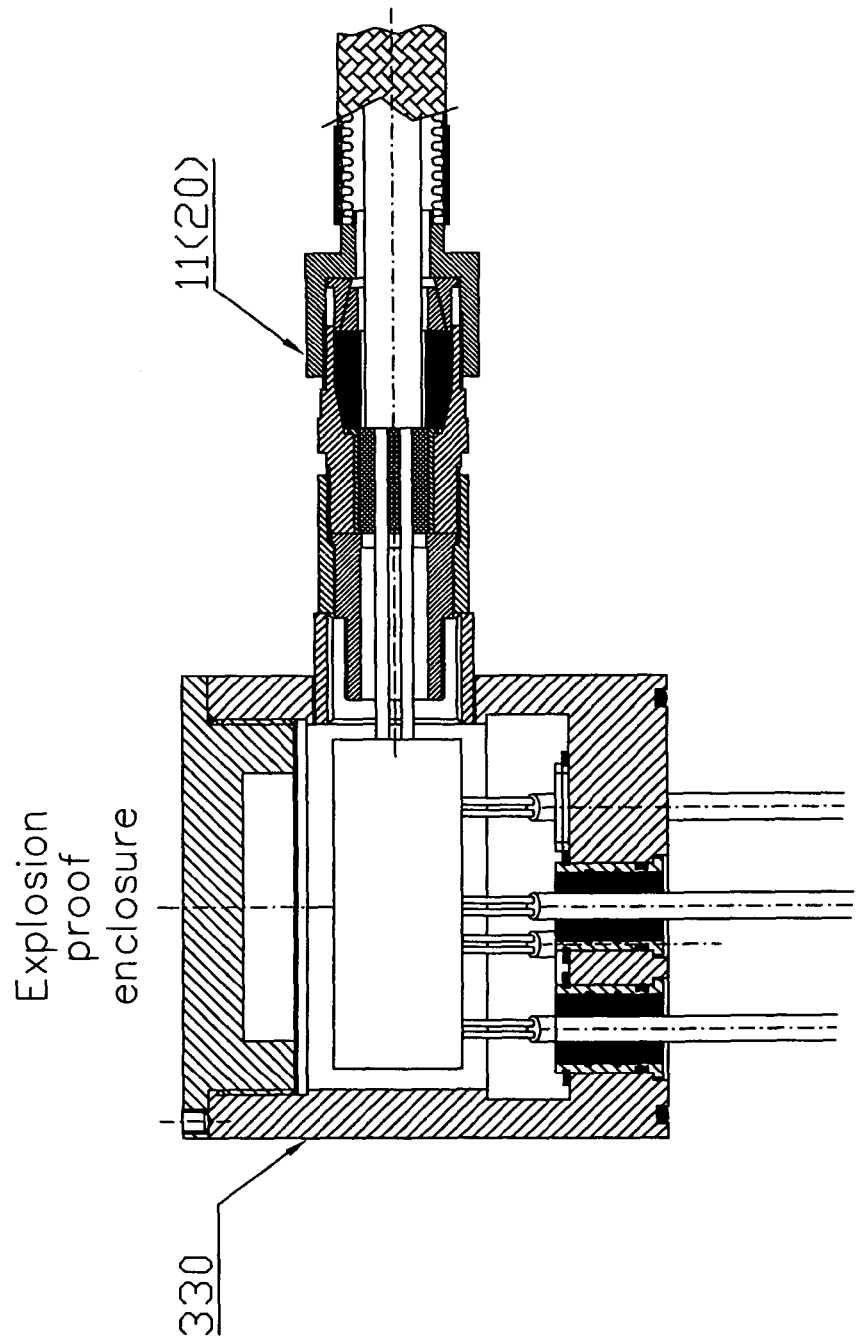
Figure 3D:
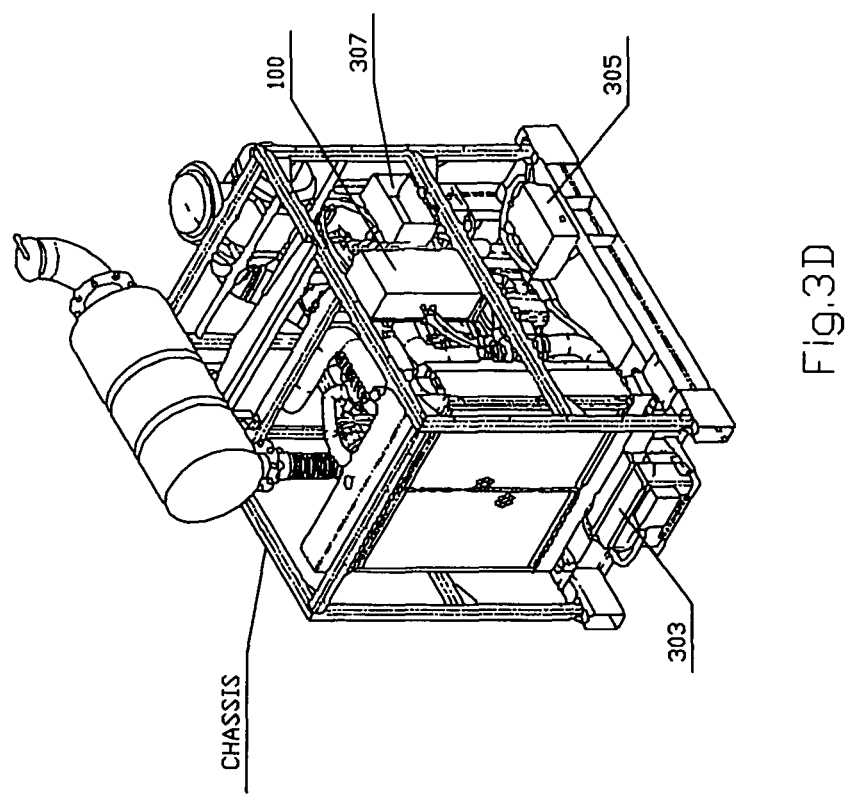
Figure 3F:
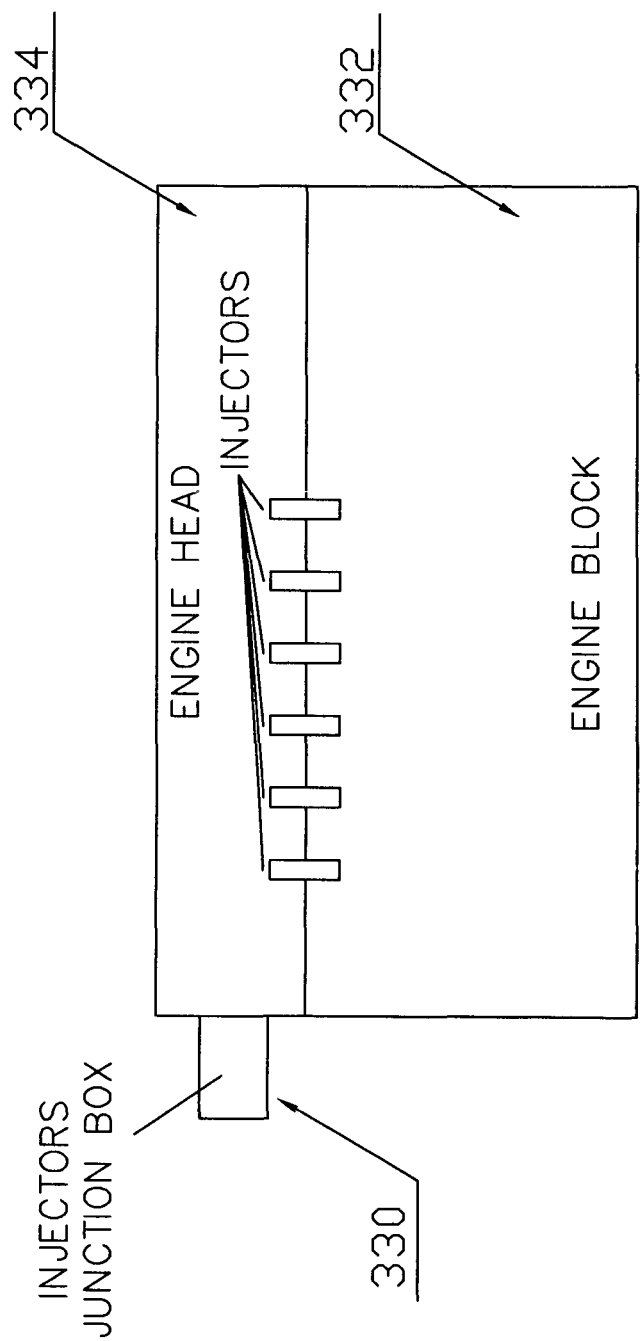

FIG. 2 shows a fully assembled connector of the type illustrated in FIGS. 1, 1A and 1B. It does not specifically show the peeling back of the metallic sheath shown in FIG. 1B.

Besides improving the ease of assembly and disassembly, a connector embodying the invention dramatically improves the integrity of sealing of the joint. In presently available cable glands, the process of sealing the area around the cable and its surrounding cylindrical surface is very cumbersome and it is virtually impossible to verify the quality of the seal. This becomes even more problematic in field service repairs. Known designs require a lot of sealant which is poured from a side elbow. In the vertical position, the sealant tends to drain downwards. This movement is retarded by placing a certain amount of cotton in the conduit below the depth of the sealant around the cable. After the sealant dries, the cotton needs to be removed. After this removal process, it is very hard to be sure that the sealing around the cable is air tight. Connectors embodying the invention eliminate this drawback since the amount of sealant required is very small and all the elements other than items 9 and 10 can be sub-assembled on the bench. Additionally, the conical part of grommet 6 expands in the horizontal direction upon tightening of the intermediate gland 8 which functions to push down on the grommet.

The connector 11, as constructed and assembled, prevents the passage of flame from propagating from the explosion proof box 100 past the sleeve 7 within the gland 8 and into the metallic conduit. Compressed air can pass from the box 100 into the metallic conduit in case of a localized explosion. However, the metallic conduit is designed to withstand a pressure of 80 bar before rupturing. The hot air or gas will simply remain trapped in the metallic conduit.

The specially designed and certified cable that passes through the metallic conduit contains conductors that are individually insulated. In case of electrical malfunction, the insulation around these conductors would melt before the exterior insulation. This could cause a short circuit which will either blow a fuse and shut down the machine or send a surge of current and trigger a shutdown via another safety card in the electrical circuit. These safeguards make the installation explosion proof.

In accordance with a method embodying the invention, a cable 1 may be inserted within and through the connector components 3, 4, 5, 6, 7, 8, 9, and 10 in either direction. A method includes welding the base nut 3 to the metallic conduit 2. Typically, cable 1 can be routed through conduit 2 and base nut 3 and pulled through bushing 4 which is then urged against the inner surface of nut 3. The outermost layer 115 of cable 1, which may include metallic fibers, can then be peeled back and draped around bushing 4. A portion of layer 115 can then be trapped between bushing 4 and conic wedge 5 and any excessive metallic layer is cut-off. Cable 1 extends through grommet 6. At the top end of the grommet 6, the outer layer of insulation 117 may be peeled to expose the individual conductors (119) with their own insulation. Next, sleeve 7 is place into intermediate gland section 8 in such a way that the lip, 715, at the bottom of sleeve 7 rests against an internal shoulder 815 of gland section 8. Next rubber grommet 6 is pushed up within gland section 8 and cable 1 is pulled, or extends, through grommet 6 and sleeve 7. Then a required amount of special sealing resin is applied around the inner diameter of sleeve 7 so as to fill the space within the sleeve. The resin is then dried (cured) to form an airtight connection through the sleeve 7. Then, upper nut 10 is positioned over capping threaded tubular member 9 and its threaded extension 91 is mated with and secured to a corresponding threaded hole in a wall of box 100. The exposed conductors of cable 1

(or whatever portion of the cable is extended through the connector) is pulled through tubular section 9 (and upper nut 10 if it extends above section 9). Upper nut 10 is then engaged with the external threads of gland 8 and turned to form a tight connection. Threaded extension 91 may be engaged in a selected threaded opening in a wall, or side, of box 100. A conductor end extending beyond the outer end of extension 91 can be connected to selected circuit points within the box 100. The connector components can then be tightened to produce an explosion proof connector assembly. The conductors of cable 1 which are pulled and/or guided into enclosure 10 are then attached to the appropriate terminals and/or electronic card housed in box 100.

In systems embodying the invention, various sensors are used to sense selected electrical, physicals and atmospheric conditions. The type of sensors may include, for example, (1) Oil temperature sensors; (2) Coolant level sensors; (3) Coolant temperature sensor; (4) Fuel pressure sensor; (5) a Turbo boost sensor; (6) a Barometric pressure sensor; (7) Oil pressure sensor; (8) an Inlet air temperature sensor; (9) Fuel temperature sensor; and (10) Start up solenoid valve. It is desirable that these components be rendered explosion proof. However, known prior art methods limited the ability to render the selected sensors explosion proof when used in a hazardous environment. The prior art problems have been resolved in systems embodying the invention.

Figure 4A:
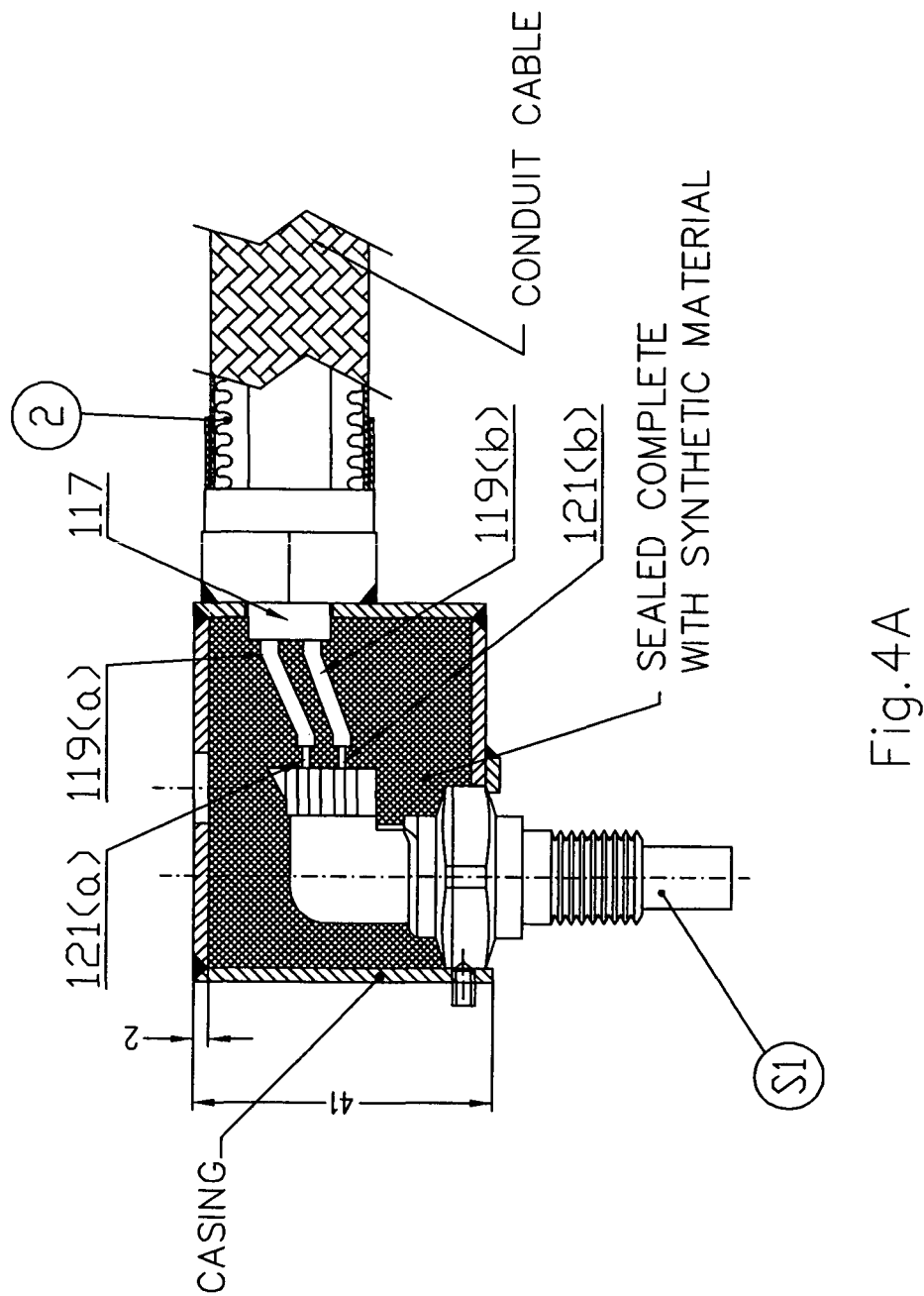
FIGS. 4A, 4B, are drawings of sensors encapsulated and encased in accordance with the invention.
Figure 4B:
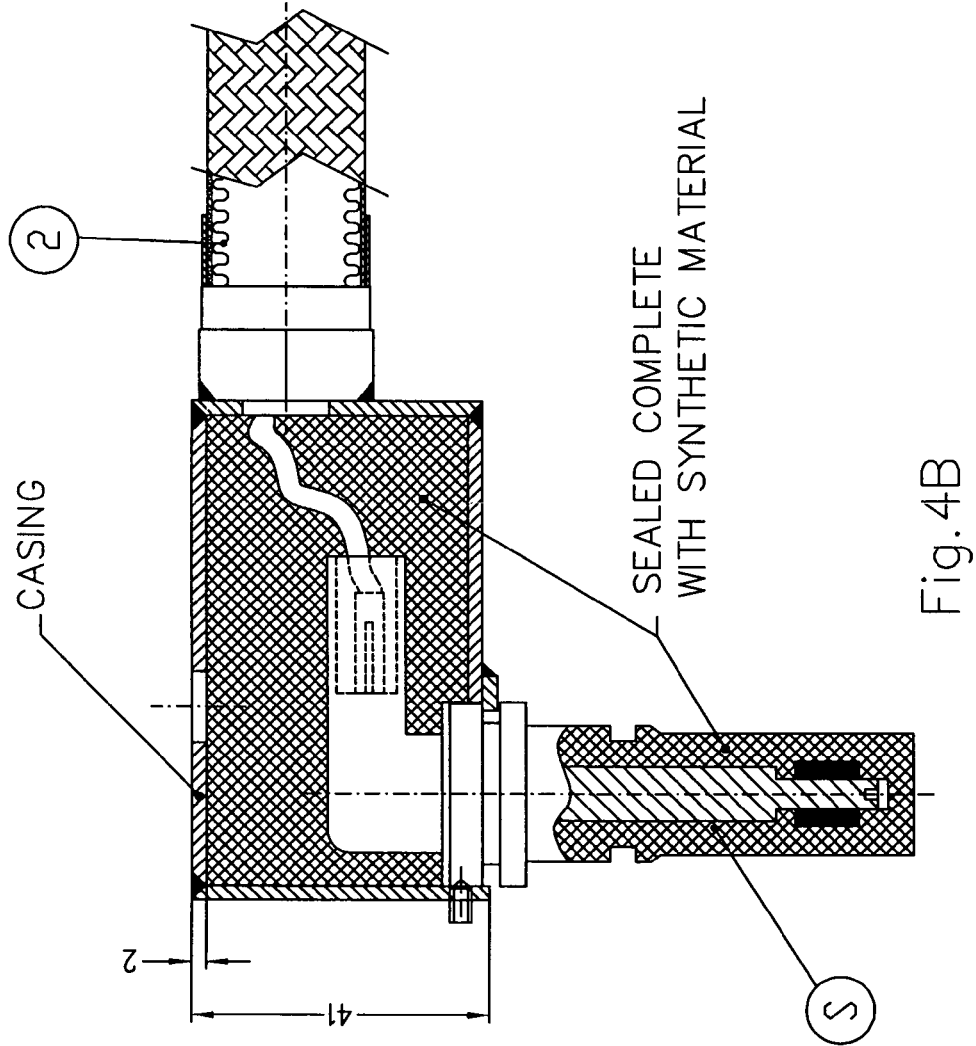

Thus, another aspect of Applicant's invention relates to rendering the sensors explosion proof and for coupling them to explosion proof enclosures via explosion proof connectors, as shown in FIGS. 4A, 4B, 4C and 4D. This includes the potting and encasing of the sensors which results in sensors which are in and of themselves explosion proof and then coupling them to explosion proof enclosures via feed through connectors embodying the invention. Referring to FIGS. 4A and 4B note that a sensor (e.g., S1) is potted and placed in an explosion proof casing and any suitable encapsulating material may be used to form a completely sealed and explosion proof assembly. The wire leads (e.g., 121a, 121b) from each sensor are connected to the corresponding conductors of a cable (where they are appropriately insulated) which can be distributed about the components of an engine and then fed through a feed-through connector 11 to terminals within an explosion proof enclosure.

Figure 4C:
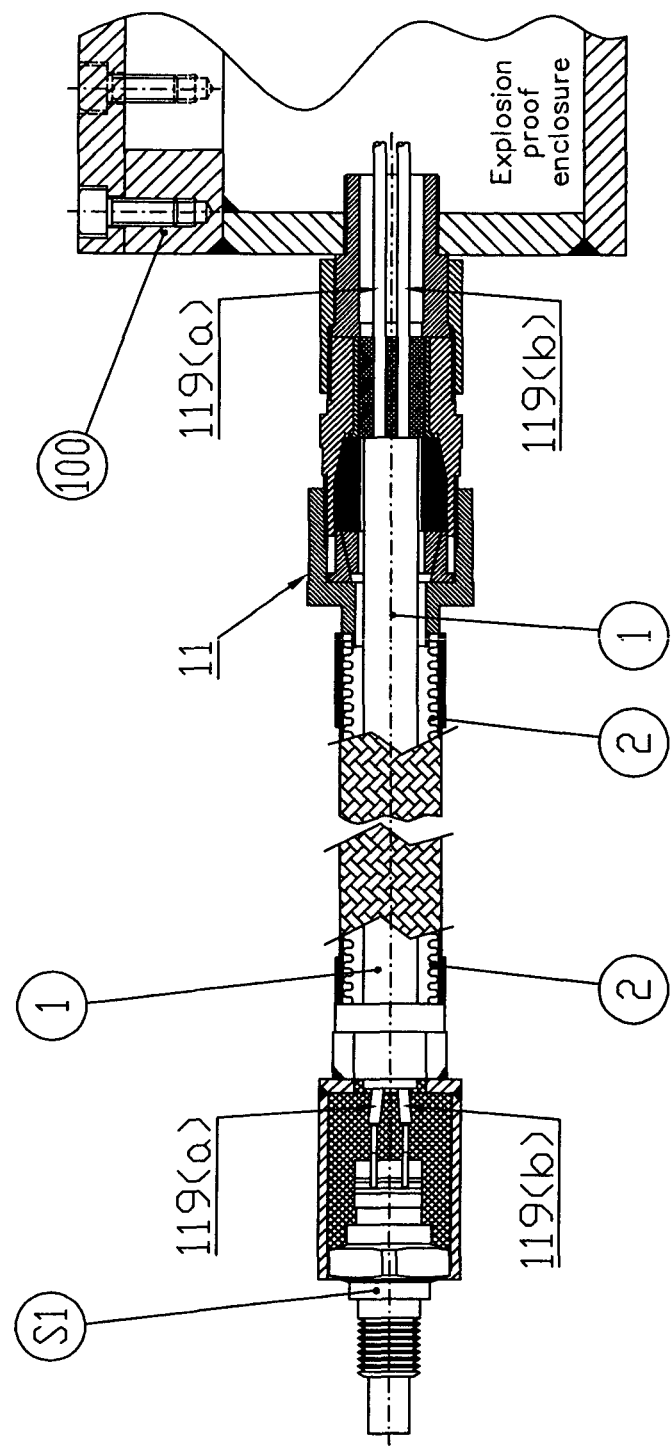
FIGS. 4C and 4D are drawings of cables coupling the encased sensors to points within an explosion proof enclosure, in accordance with the invention.
Figure 4D:
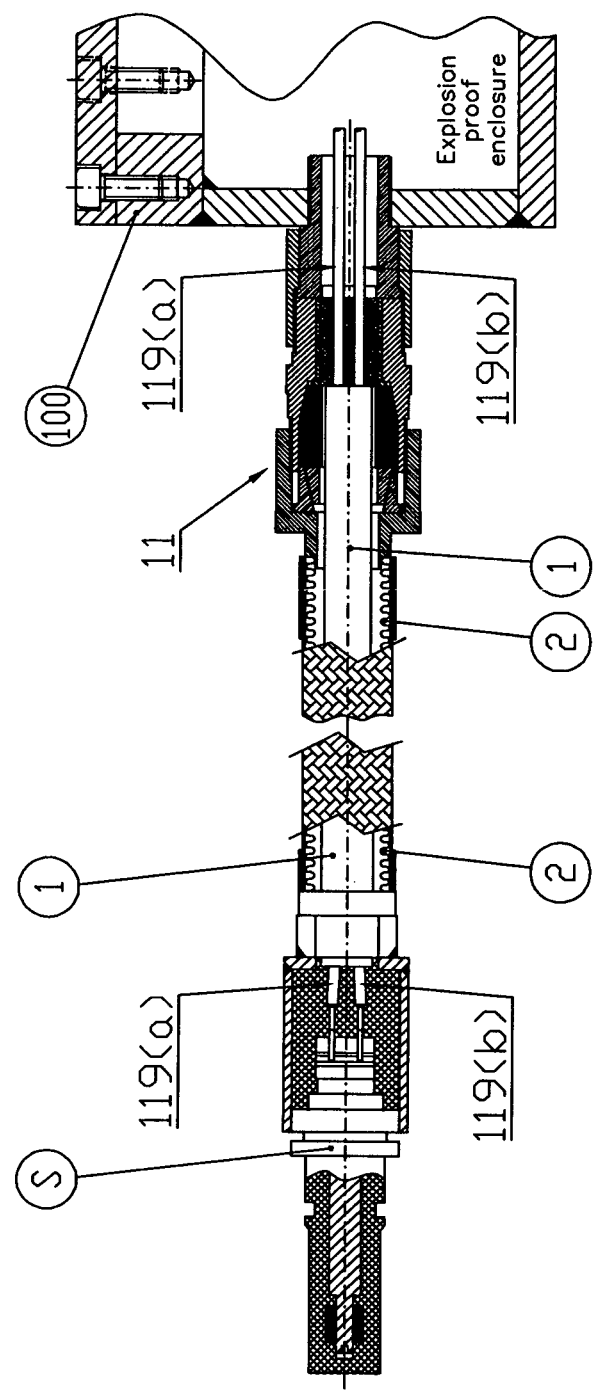

Thus, as shown in FIGS. 4A and 4B, the sensors are encased in an explosion proof casing and the sensor leads are connected to a reinforced cable and via a cable gland embodying the invention to an explosion proof enclosure. In FIG. 4A the sensor (e.g., S1) is encased in a package having a threaded terminal for securing the sensor to a sensing point. In FIG. 4B, the sensor is encased in a package having slip fit (push through or non-threaded) terminal for securing the sensor to a sensing point. It should be noted that as to certain sensors, such as those inserted in the engine block, a special resin is injected around the space between the electrical element and the (plastic) casing. This removes the free volume and tends to make the sensor explosion proof. FIGS. 4C and 4D show the coupling of the sensors of FIGS. 4A and 4B via a cable gland 11 embodying the invention to an explosion proof enclosure.

In accordance with the invention the sensors are encapsulated. So, if a sensor is subjected to a fault condition generating a hazardous condition, the hazardous condition will not cause an explosion within the surrounding atmosphere. Other fault conditions attributable to the operation of a sensor such as a short circuit causing large current flow may be independently treated by sensing an over limit current and shutting down the system.

Thus, Applicant's invention focuses on eliminating the free volume around the sensors, solenoid valves and injectors by encapsulating the components in question with an appropriate resin. Further, an explosion proof casing is provided around the encapsulation which protects both the encapsulation and the electrical wiring associated with the sensor. When required, the electrical wiring may be attached to the casing. Also sensor wire(s) may be encased in a semi flexible metallic conduit and connected to an explosion proof enclosure. This eliminates the possibility of creation of any spark or heat induced combustion in the environment.

The apparatus and processes described above may be replicated for encapsulating, enclosing and interconnecting components such as: (1) Alternator; (2) Starter motor; (3) Lights; (4) Dash display enclosure; (5) All other explosion proof enclosures on the engine; (6) Variable speed governor; and (7) Injector junction box.

For an internal combustion engine (ICE) to be approved for usage in US, Class 1, Division 1 (C1D1) area, it needs to meet all the requirements applicable for C1D1 electrical system. The inventive concepts described above are, and/or can be, applied to the following components to enable them to be certified (C1D1) as being explosion proof.

1. Certified sensors with original electrical characteristics (each sensor individually certified)
2. Certified fuel injectors and injector box (if applicable)
3. Certified solenoid valves
4. Certified glow plugs
5. Certified metallic conduits carrying all high current cables
6. Certified cable glands for use in C1D1 environment
7. Certified enclosures for control panels
8. Certified battery and battery box
9. Certified quick disconnects for the battery since the engine is fixed in its location
10. Certified intrinsically safe barrier
11. Certified intrinsically safe electrical system for low energy circuits
12. Separate safety system that monitors critical parameters with shutdown capability
13. Certified electrical switches (each switch individually certified)
14. Certified ignition key, alternator, governor, relays and electric connectors,
15. Certified greases, silicones and adhesives suitable for the expected temperature range
16. Certified options offering including lights, flashing beacon, electric start and electric motors; and
17. Certified complete systems comprising all applicable elements listed above mounted on an operational engine Incorporating the above, including those incorporating the present invention, makes possible the design and/or retrofitting of an internal combustion engine so it is explosion proof and meets the C1D1 requirements for the system.

FIGS. 3A, 3B, 3C, 3D, 3E and 3F illustrate the placement and interconnection of various components of an internal combustion engine (ICE) to ensure operation of the engine even in an explosive environment. The explosion proof enclosure 100 may contain numerous components such as the engine controller, relays, terminal strip, earth leakage card, and the controller 112 for controlling many aspects of the operation of the engine. Twelve cable assemblies carrying signals from various sensors (e.g., EVA, FTS) are shown coupled via their respective feedthrough connectors [11(1) through 11(12)] to enclosure 100. The cables from a generator 301 are coupled via connectors 11(13) and 11(14) to enclosure 100. A battery 303 encased in its own explosion proof enclosure has a set of cables for coupling the battery to a cut off battery switch box 305. Three cable assemblies are shown connected between explosion proof box 305 and enclosure 100 via connectors 11(15)-11(17) at the enclosure 100 end. A cable assembly is connected between the explosion proof dashboard box 307 containing the various dashboard indicators ending in a connector 11(18) at the enclosure end. A cable assembly 113 is shown connected between the enclosure 100 and explosion proof fuel injector junction box 330. The cable assembly 113 is shown to be terminated at the enclosure end via connector 11(19) and at the junction box end via connector 11(20). The junction box 330 is mounted on the engine block 332 and its signals are distributed to the various injectors (e.g. INJ1 to INJ6) within the engine.

The battery in an ICE engine can discharge on occasion or require replacement. This requires that at times the battery needs to be recharged or replaced. Recharging a battery in a hazardous/explosive environment is problematic. There are no explosion proof battery chargers available for charging the automotive batteries in hazardous environments. To resolve this problem there is provided battery connections which are easily accessible and explosion proof connectors. Replacement of the battery is problematic because the removal of the battery may cause sparks or arcing which can generate an explosion. In accordance with the invention, the battery 303 is equipped with explosion proof quick disconnecting plugs (see FIG. 3E) and is placed (see FIG. 3D) in an easily accessible area (e.g., the engine cradle) to provide easy access. This protection scheme is in addition to a battery cut out switch 305. Additionally, a battery can be removed by activating 4 bolts which enable for quickly disconnecting the battery. It is estimated that the whole replacement process can be completed in less than 15 minutes, dramatically reducing the equipment down time.

The placement of the fuel injector box 330 is critical. In accordance with the invention, the injector box 330 is fastened to the engine head cover 334 (associated with the engine block see FIGS. 3B and 3F) using an air tight joint. The coupling between the controller 112 and the injector box 330 includes an explosion proof multi cable conductor 113 provided with explosion proof cable glands of the type described above. The outputs of the injector box are coupled to their respective fuel injectors within the engine block via 6 separate cables (see FIG. 3B). The conductors are separated and routed through steel sleeves creating and air tight joint with each sleeve.

The system also includes means for containing sparks and heat generation during normal and fault conditions to neutralize the risk of fire and/or explosions.—describe where and how A safe explosion proof automatic and electronic ignition system is possible with the machinery as configured and interconnected with explosion proof connectors and cables.

The equipment has been designed such that the various components of the engines and machines are positioned/packaged for increased protection against sparking and explosions.

All the components which can possibly generate a spark are enclosed in explosion proof enclosures or are routed through metallic conduits. In the event a malfunction occurs and a spark is generated, the localized explosion would be contained in these enclosures. The openings in the enclosures are connected to associated electrical circuits using sealed explosion proof connectors or cable glands. These cable glands are sealed using high temperature silicone grease and compressed rubber grommets. This arrangement contains the hot gases in the explosion proof enclosure and eliminates the possibility of explosions in the external environment. Multiple such enclosures are used on the system as necessitated by the overall machine design.

The electrical circuit of the system includes a card known as "earth leakage card" (not shown). This card, among other functions, continually looks for the presence of abnormally high currents in the circuits. Thus, the system includes means for detecting abnormal current flow and to then shut down the internal combustion engine (ICE), electrical machine and/or hybrid machine to prevent sparking or explosions.

What is claimed is:

1. A feed-through connector for coupling a cable between at least one terminal point external to an explosion proof enclosure and at least one terminal point within the enclosure comprising:

a generally cylindrical intermediate section having an internal central opening; the intermediate section having a lower, input, portion to receive a cable from a terminal external to the explosion proof enclosure and having an upper, output, portion for passing the cable for connection to a terminal within the explosion proof enclosure; and a sealing tube located between the input and output portions of the intermediate section and extending from the input portion to the output portion along the internal central opening of the intermediate section; said sealing tube having a central opening for enabling a cable to be passed through and for enabling a sealant to be injected into the sealing tube to form an air tight connection between the cable and the inner walls of the sealing tube which inhibits sparks or flames from passing through and around the sealing tube; and wherein the intermediate section has an internal ledge between its lower and upper portions, said internal ledge extending inwardly and perpendicularly, and wherein the sealing tube has a lower end with a lip extending perpendicularly outward relative to the central opening of the sealing tube, below the internal ledge, and the sealing tube extending beyond the internal ledge into the output portion, said lip blocking the lower end of the sealing tube from passing beyond the internal ledge.

2. A feed-through connector as claimed in claim 1, wherein the lower, input, portion of the intermediate section includes means for securing the cable and for the positioning of the sealing tube within the lower portion and further including a base nut for capping the input portion of the intermediate section and being engagingly connected thereto to form a tight explosion proof connection while providing a passageway for the cable.

3. A feed-through connector as claimed in claim 2 including means for capping the upper, output, portion of the intermediate section including a tubular member extending between the output portion of the intermediate section and the enclosure for providing an explosion proof passageway therebetween, and including a top, upper, nut for securing the capping and tubular means to the upper portion of the intermediate section and forming a tight explosion proof connection.

4. A feed-through connector as claimed in claim 2, wherein said means for securing the cable and the sealing tube includes a bushing mounted on the inside of the base nut, a conic shaped wedge mounted above the bushing for selectively wedging a layer of cable insulation, and a rubber grommet connected between the wedge and the end of the sealing tube in the lower portion of the intermediate section.

5. A feed-through connector as claimed in claim 3, wherein the outer surfaces of the lower and upper portions of the intermediate section are threaded and wherein the base nut has an inner surface which is threaded to engage the threads of the lower portion of the intermediate section and the top nut is threaded to engage the threads of the upper portion of the intermediate section.

6. A feed-through connector as claimed in claim 4, wherein the cable includes an outer metallic sheath and wherein the metallic sheath may be selectively peeled back and draped about the bushing and the conic shaped wedge is pressable against the metallic sheath for holding it firmly while the rest of the cable passes through the grommet.

7. A feed-through connector as claimed in claim 1, wherein a terminal point external to the explosion proof enclosure includes a sensor which is encapsulated and encased in an explosion proof casing; and wherein the sensor has conductors which are fitted into a cable which is designed to be coupled to and via the feed-through connector to a terminal point within the enclosure.

8. A system for providing protection against the generation of explosions in a hazardous environment comprising: an explosion proof enclosure in which components subject to producing sparks or other hazardous conditions are placed; encapsulating selected sensors located externally to the enclosure and encasing them in explosion proof casings; and cabling means coupled between the selected sensors and selected components within the enclosure via a feedthrough connector which provides an airtight connection inhibiting any hazardous condition from passing out of the enclosure via the cable connection; wherein said feedthrough connector includes a generally cylindrical intermediate section having an internal central opening; the intermediate section having a lower, input, portion to receive a cable from a terminal external to the explosion proof enclosure and having an upper, output, portion for passing the cable for connection to a terminal within the explosion proof enclosure; and a sealing tube located between the input and output portions of the intermediate section and extending from the input portion to the output portion along the internal central opening of the intermediate section; said sealing tube having a central opening for enabling a cable to be passed through and for enabling a sealant to be injected into the sealing tube to form an air tight connection between the cable and the inner walls of the sealing tube which inhibits sparks or flames from passing through and around the sealing tube.

9. A system as claimed in claim 8 wherein the lower, input, portion of the intermediate section includes means for securing the cable and the positioning of the sealing tube within the lower portion and further including a base nut for capping the input portion of the intermediate section and being engagingly connected thereto to form a tight explosion proof fit while providing a passageway for the cable.

10. A system as claimed in claim 9, including an upper nut for capping the upper, output, portion of the intermediate section and forming a tight explosion proof connection with it; and insertion means for inserting and securing the connector to a wall of the enclosure while providing a passageway for the cable to be introduced into the enclosure.

11. A system as claimed in claim 9, wherein said means for securing the cable and the position of the sealing tube includes a bushing mounted on the inside surface of the base nut, a conic shaped wedge mounted above the bushing for selectively wedging a layer of cable insulation, and a rubber grommet connected between the wedge and the end of the sealing tube in the lower portion of the intermediate section.

12. A system as claimed in claim 11, wherein the outer surfaces of the lower and upper portions of the intermediate section are threaded and wherein the base nut has an inner surface which is threaded to engage the threads of the lower portion and the upper nut is threaded to engage the threads of the upper portion.

13. A system as claimed in claim 12, wherein the cable includes an outer metallic sheath and wherein the metallic sheath may be is peeled back and draped about the bushing and the conic shaped wedge presses against the metallic sheath holding it firmly while the rest of the cable passes through the grommet.

14. A feed-through connector as claimed in claim 8, wherein the intermediate section has an internal ledge between its lower and upper portions, said internal ledge extending inwardly and perpendicularly relative to the inner walls of the intermediate section, and wherein the sealing tube has a lower end located, below the internal ledge, in the lower input end of the intermediate section, said lower end of the sealing tube having a lip extending perpendicularly outward relative to the central opening of the sealing tube, and the sealing tube extending beyond the internal ledge into the upper output portion of the intermediate section, and wherein the lip of the sealing tube prevents the sealing tube from passing beyond the internal ledge.

15. A feed-through connector as claimed in claim 8, wherein a terminal external to the explosion proof enclosure includes a sensor which is encapsulated and encased in an explosion proof casing; and wherein the sensor has conductors which are fitted into a cable which is designed to be coupled to and via the feed-through connector to a terminal within the enclosure.

16. A cable gland comprising:
   a generally cylindrical intermediate section having an internal central opening for enabling a cable to be pass through; said intermediate section having a lower portion whose outer surface is threaded and having an upper portion whose outer surface is also threaded; said lower portion adapted to receive a cable and function as an input and said upper portion adapted pass the cable;
   a cup shaped base nut having a shoulder region from which extends a cylindrical upper portion whose internal surface is threaded to engage with the outer surface of the lower portion of the intermediate section, said base nut having an internal central opening for enabling the cable to pass through;
   an inverted cup shaped upper nut having a shoulder region from which descends a cylindrical lower portion extending below the shoulder region, the cylindrical lower portion having an internal surface which is threaded to engage the outer surface of the upper portion of the intermediate section; said upper nut having an internal central opening for enabling the cable to pass through;
   a cylindrical tubular member having a threaded shaft extending above the upper portion of the intermediate section and beyond the shoulder region of the upper nut for insertion into a side of an enclosure, said cylindrically tubular member also having a base section extending perpendicularly to the threaded shaft said base section being located between the upper portion of the intermediate section and the upper nut, said threaded shaft and said base section of said cylindrically tubular member having an internal central opening for enabling the cable to pass through and being secured to said intermediate section via said upper nut; and
   sealing means including a sealing tube extending within the internal central opening of the intermediate section from the lower portion into the upper portion, said sealing tube having a central opening for enabling a cable to be passed through and for the application of a sealant to the cable within the central opening of the sealing tube for inhibiting a hazardous condition occurring within said enclosure from propagating along the cable past the sealing tube.

17. A cable gland as claimed in claim 16 wherein said sealing tube has a bottom end within the lower portion of the intermediate component and an upper end within the upper portion of the intermediate component; and wherein said sealing means includes a cylindrical retaining ring located above the shoulder region of the base nut, a cone shaped wedge component for pressing against the retaining ring and a cylindrical grommet located between the cone shaped wedge and the bottom end of the sealing tube; and wherein the base nut can be turned to hold the parts in the lower portion of the intermediate component tightly together and form an explosion proof connection.

18. A cable gland as claimed in claim 16, wherein the cable includes an outer insulation sheath including metallic fibers encircling a number of conductors, and wherein said sheath may be terminated and draped around the retaining ring and wherein said cone shaped wedge is wedged between the conductors and the insulator layer for firmly securing the insulator layer against and onto the retaining ring.

19. A cable gland as claimed in claim 17, wherein said cylindrical threaded tubular member includes a base region overlying the upper portion of the intermediate section and wherein the upper nut when turned presses the base region absent the upper portion.

\* \* \* \* \*